No. 676,248. Patented June 11, 1901.
L. A. ASPINWALL.
AGRICULTURAL IMPLEMENT.
(Application filed Oct. 24, 1900.)
(No Model.)
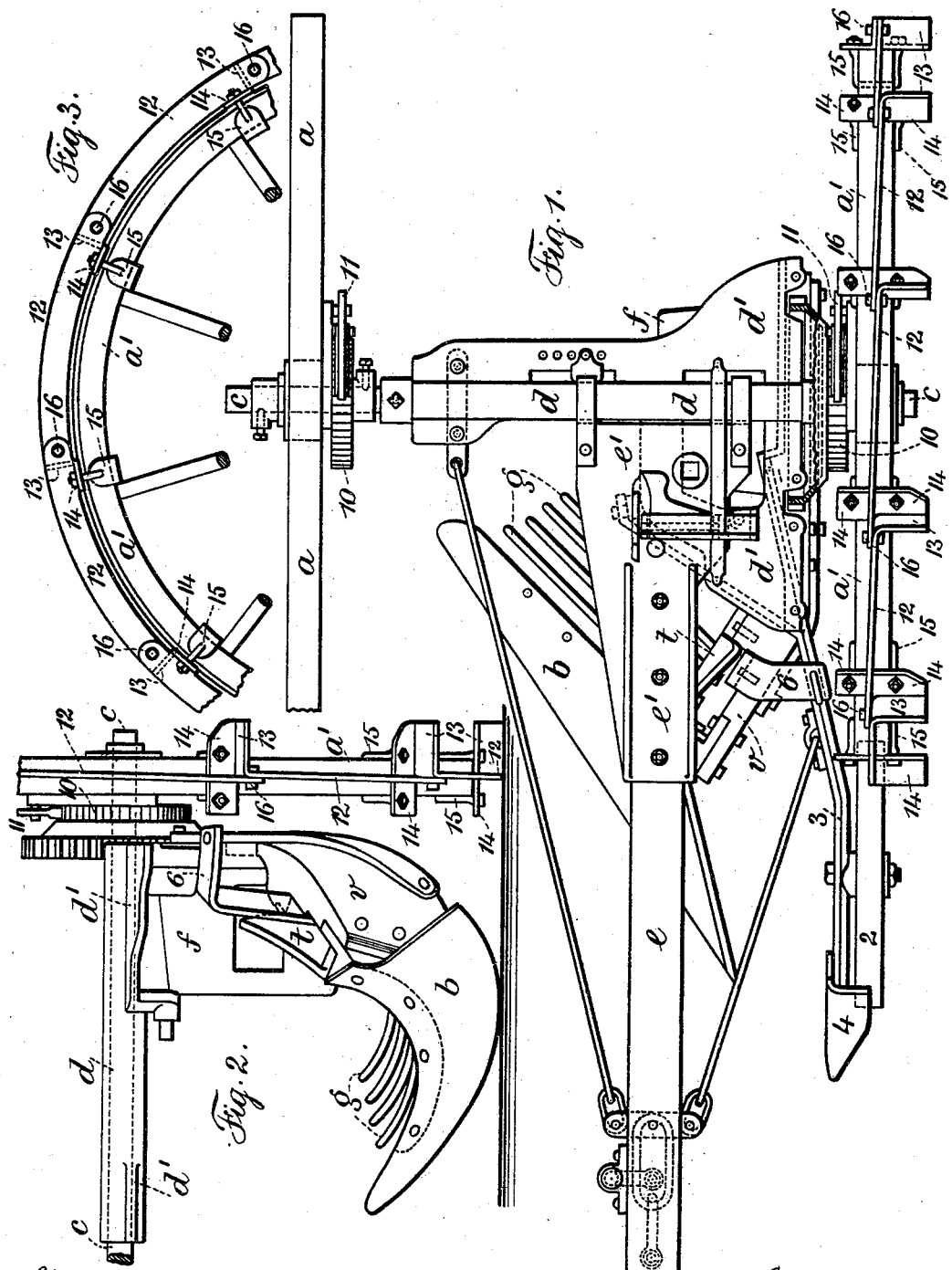
Witnesses:
J. Staib
Chas. N. Smith
Inventor
Lewis A. Aspinwall
per L. W. Serrell & Son
atty.

UNITED STATES PATENT OFFICE.

LEWIS AUGUSTUS ASPINWALL, OF JACKSON, MICHIGAN, ASSIGNOR TO THE ASPINWALL MANUFACTURING COMPANY, OF SAME PLACE.

AGRICULTURAL IMPLEMENT.

SPECIFICATION forming part of Letters Patent No. 676,248, dated June 11, 1901.

Original application filed April 2, 1900, Serial No. 11,038. Divided and this application filed October 24, 1900. Serial No. 34,110. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Agricultural Implements, of which the following is a specification.

My present invention relates particularly to the draft-wheels of agricultural implements, and the same forms a division of my application, Serial No. 11,038, filed April 2, 1900, for Letters Patent for improvement in potato-diggers.

The object of the present invention is to prevent a sidewise sliding and swinging movement of the implement and also the slipping of the wheels when at work.

In carrying out the present invention I employ one wheel of the implement smaller than the other and a series of segmental wheel-flanges and devices for attaching the same to the smaller of the driving-wheels, so that with the flanges the diameter of the smaller wheel to which the same are attached approximates the diameter of the other driving-wheel. These segmental flanges are provided with bent ends and flat portions, the said parts being secured to the felly of the wheel and acting to engage the surface of the ground in opposite directions.

In the drawings, Figure 1 is a plan view representing my improvement. Fig. 2 is a partial elevation from the front of the machine with some of the parts removed, and Fig. 3 is an elevation of part of the wheel carrying the segmental flanges.

My present invention is especially adapted to and has been used in connection with potato-diggers, although the same is applicable to agricultural implements generally, and as illustrating an agricultural implement I have shown some of the parts illustrated and described in the aforesaid application. In these parts the lead-wheel 2 is on a frame 3, to the forward end of which the colter 4 is secured, the object of which is to separate or divide the tops and weeds of one row from those of the adjacent row. The plow $b$ is connected to a frame $v$, and to this an arm 6 is connected, and a frame $f$ is also connected to these parts, and the said parts in turn are connected to the plate $d'$, which carries the sleeve $d$, surrounding and supported by the main axle $c$ of the machine, there being a pole-frame $e'$, carrying the pole $e$, and also a grating $g$, adjacent to the plow $b$, providing for discharging the earth through the grating as the same comes over the upper edge of the plow $b$, and a fender $t$ is adjacent to the plow $b$ and grating $g$ and supported by the frame $v$.

$a\, a'$ are the wheels, mounted upon the axle $c$, one of the same being loose and the other fast, and $a'$ being the smaller of the wheels, and there being a pawl 11 and ratchet 10 for controlling the operations of the said wheels where one is required to travel faster than the other. These parts are shown and described with a view of setting up an operative device in connection with the peculiarity of the wheels, although it is to be understood that the wheels are to be employed in connection with any agricultural implement.

The new features of my device relate to the series of segmental wheel-flanges 12, made concentric with the periphery of the smaller wheel $a'$ of the pair. These wheel-flanges are alike and are each made with a bent end 13 and with a flat portion 14 at right angles to the bent end 13 and extending beyond the flanges 12 in a direction opposite to that taken by the bent end. The portions 14 rest upon the periphery of the wheel, and they are secured to the wheel $a'$ by yokes 15, whose threaded ends pass through holes in the flat portions 14, and nuts are employed upon the threaded ends for holding the flat portions, and with them the segmental wheel-flanges 12 and bent ends 13, securely to the felly of the wheel.

The free end of each segmental wheel-flange is secured to the adjacent wheel-flanges near the bent ends by bolts 16, which pass through the ends of the flanges and through the body portion of the adjacent flanges, and the said flanges are placed so as to be almost in line and directly over the center of the felly of the wheel, the said wheel $a'$ being made sufficiently smaller than the wheel $a$ upon the opposite side of the machine so that the wheel $a'$, together with the segmental flanges, agrees, approximately, in diameter with the wheel a. In the operation of the machine these segmental flanges cut into the surface of the ground and act as a rib to prevent the lateral motion of the machine, and their position is such that they constitute a practically endless flange projecting from the felly of the wheel. The bent ends 13 cut into the ground at the same time with the flanges 12 and at right angles thereto and act as paddles to prevent the wheels slipping, so that between the grip of the flanges and the grip of the bent ends a firm hold is obtained by the agricultural implement upon the ground, so as not only to prevent lateral slipping or movement, but to positively affect the movements of the parts of the agricultural implement which depend for their operative power upon the progressive movement of the implement over the ground, the rotation of the wheel being communicated by mechanical devices to the operative parts.

I claim as my invention—

1. The combination in an agricultural implement with one supporting-wheel, of a wheel on the other side of the machine smaller in diameter, and means connected to the felly of said wheel to increase the diameter of the same to approximately that of the first wheel, and which means bearing upon the ground prevent the lateral movement of the machine and assist in transmitting the power to the various devices of the machine, substantially as set forth.

2. In an agricultural implement, the combination with one of the wheels, of a wheel on the other side of the machine of smaller diameter, a series of segmental flanges, and means for connecting the same together and in vertical planes to the felly of the wheel, substantially as set forth.

3. In an agricultural implement, the combination with one of the wheels, of the wheel on the other side of the machine of smaller diameter, a series of segmental flanges alike and curved to conform to the periphery of the wheel and each made with a bent end and a flat portion, and yokes passing around the felly of the wheel and with threaded ends through the flat portions, and bolts connecting the flat portions to the rim or felly of the wheel, the said flanges being connected together at the free end of one flange and at the other flange adjacent to the bent end, substantially as and for the purposes set forth.

4. In an agricultural implement, the combination with one of the wheels, of the wheel on the other side of the machine of smaller diameter, a series of segmental flanges in a vertical plane projecting from the felly of the wheel, ends to said wheel-flanges bent at approximately right angles thereto, and flat portions bent at approximately right angles to the bent ends and integral therewith and projecting at one side beyond the said segmental flanges, and means for connecting the segmental flanges to the felly of the wheel at said flat portions, substantially as set forth.

Signed by me this 17th day of October, 1900.

LEWIS AUGUSTUS ASPINWALL.

Witnesses:
C. G. ROWLEY,
W. C. SHANAFELT.